Sept. 12, 1967    C. A. MATTSON ETAL    3,341,235
AUXILIARY HANDLE FOR TRIMMER-EDGER
Original Filed Aug. 19, 1963
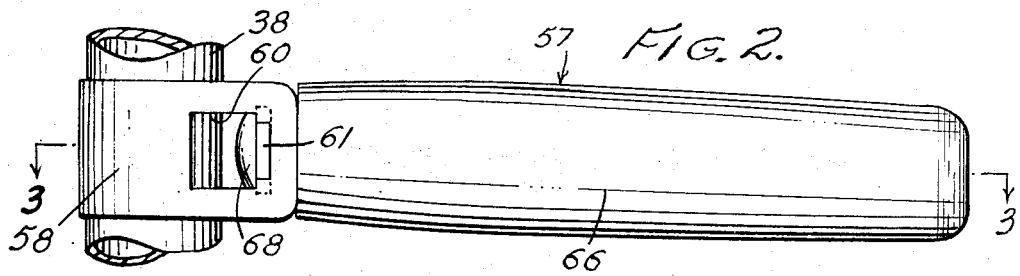
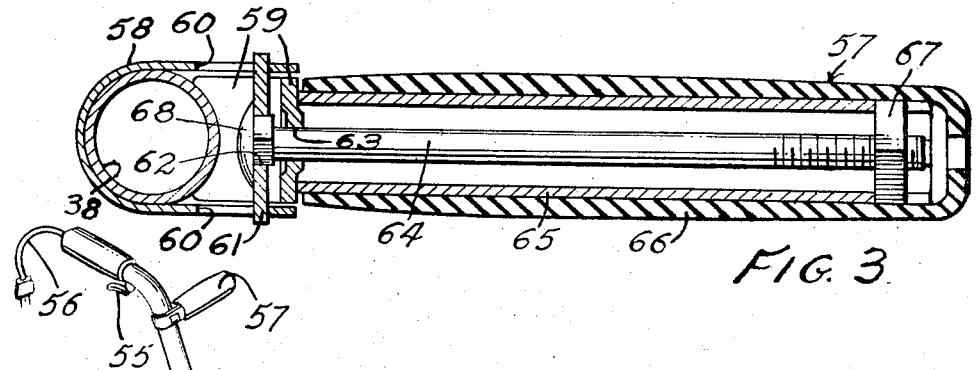
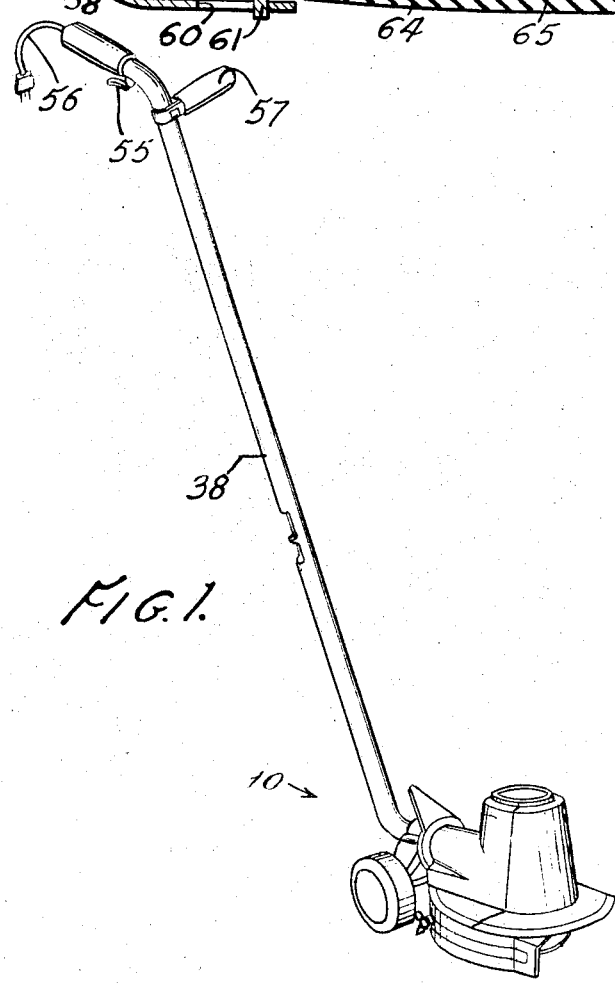
INVENTORS:
Charles A. Mattson
Marvin K. Olsen
Fredrick O. Ottosen, deceased,
by Harriet Ottosen, Executrix
By George R. Clark    Atty

United States Patent Office 3,341,235
Patented Sept. 12, 1967

3,341,235
AUXILIARY HANDLE FOR TRIMMER-EDGER
Charles A. Mattson, Oak Park, Ill., and Fredrick O. Ottosen, deceased, late of Chicago, Ill., by Harriet Ottosen, executrix, Chicago, Ill., and Marvin R. Olsen, Caldwell, Idaho, assignors to Sunbeam Corporation, Chicago, Ill., a corporation of Illinois
Continuation of application Ser. No. 303,474, Aug. 19, 1963. This application Sept. 27, 1965, Ser. No. 490,741
1 Claim. (Cl. 287—57)

This invention relates to improvements in devices for trimming and edging lawns. The instant application is a continuation of our copending patent application Serial No. 303,474, filed August 19, 1963, for Trimmer-Edger, now U.S. Pat. No. 3,221,481.

It is an object of this invention to provide an improved auxiliary handle for trimmers and edgers.

The invention will be better understood by considering the following description taken in connection with the accompanying drawings, and its scope will be pointed out in the appended claim.

In the drawings:

FIG. 1 is a perspective view of an edger-trimmer device;

FIG. 2 is an enlarged side view of the auxiliary handle; and

FIG. 3 is a sectional view taken along the section line 3—3 of FIG. 2.

Briefly, in the invention the motor housing is split into complementary rear and front sections with the motor being completely assembled in the rear section and the front section serving as a cover for the rear section and its assembled motor. A tubular handle is connected to the rear portion of the housing. The air inlet for cooling the motor is formed in the guide handle. The motor drives a motor cooling fan and the fan exhausts are located in the bottom portion of the motor housing. A baffle is positioned between the motor and the entrance of the front end of the handle into the housing to direct the incoming air first up to the top of the motor and then down thereover.

Briefly, in the invention the auxiliary handle comprises a pair of U-shaped brackets which are nested with respect to each other in opposed and 90 degree shifted relationship about the main guide handle. Means is provided inside the auxiliary handle to loosen or tighten these brackets with respect to the main guide handle merely by turning the auxiliary handle.

Referring first to FIG. 1, the edger-trimmer comprises a main handle 38 which is directed downwardly and forwardly, and a power head, indicated generally by reference numeral 10, at the lower end of the main handle 38. The details of power head 10 will not be described herein since they are fully explained in our parent Patent 3,221,481. As will be clear from said patent, power head 10 contains a not shown electric motor for driving a not shown blade to edge and trim lawns. The device will trim lawns when power head 10 is in its shown position, and edge lawns when it is rotated clockwise ninety degrees from its shown position.

The upper end of the handle 38 has a finger operated switch 55 and an electrical connector cord 56. The cord 56 extends through the handle 38 for connection to a not shown motor contained in the power head 10.

Mounted on the upper end of main guide handle 38 is an auxiliary handle 57. This handle is adjustable about and along the handle 38. It comprises a pair of U-shaped clamping brackets 58 and 59, see also FIGS. 2 and 3. These brackets are nested one within the other in opposed and 90 degree shifted relationship. A pair of notches 60 is formed in the opposite ends of the bracket 58. A crosspiece 61 spans these notches. Aligned apertures 62 and 63 are formed in the cross-piece 61 and bight portion of the bracket 59. A stud 64 extends through these apertures into a metallic tubular member 65 which is surrounded by a plastic or insulating material sleeve 66. A nut 67 is held captive in the outer end of sleeve 66. The outer threaded end of stud 64 enters nut 67. Thus, when the handle 57 is turned, the inner end of tubular member 65 bears on bracket 59 and the head 68 of stud 64 bears on cross-piece 61 to urge the two brackets towards each other into clamping relationship with the main handle 38. The portion of stud 64 just beneath head 68 and the aperture 62 have matching irregular shapes so that stud 64 does not turn relative to the cross-piece 61 when the handle 57 is turned. A few turns of the handle 57 will sufficiently loosen the connection so that the auxiliary handle can be moved to any desired position and then retightened.

While there has been illustrated and described a particular embodiment of the present invention, it will be understood that changes and modifications may occur to those skilled in the art, and it is, therefore, contemplated by the appended claim to cover all such changes and modifications as fall within the true spirit and scope of the present invention.

What is claimed as new and desired to be secured by Letters Patent of the United States is:

In a grass trimmer having a main guide handle which is directed downwardly and forwardly wherein an auxiliary laterally projecting adjustable handle is connected to the upper end of said guide handle, said adjustable handle comprising a first U-shaped bracket embracing said guide handle, the opposite ends of said bracket having notches formed therein, another U-shaped bracket, said another bracket being disposed within said first bracket in opposed ninety degree shifted relationship, a cross member extending between said notches and brackets, aligned apertures formed in said cross member and another bracket, a threaded bolt extending through said aligned apertures, means acting between said bolt and said cross member to prevent relative rotary motion therebetween, and a rotatable tubular member on said bolt in abutting relationship with respect to said another bracket, said tubular member having a nut member therein connected thereto which is engageable with the outer end of said bolt to move said brackets towards each other in clamping relationship with respect to said guide handle upon rotation of said tubular member, opposite ends of said cross member being disposed in said notches, and rotation of said tubular member causing movement of said cross member in said notches.

References Cited

UNITED STATES PATENTS

| 297,213 | 4/1884 | Wildt | 287—57 |
| 2,267,308 | 12/1941 | Russell et al. | 74—557 |
| 2,561,961 | 7/1951 | White | 74—557 |
| 2,790,330 | 4/1957 | Sinko | 74—557 |

CARL W. TOMLIN, *Primary Examiner.*

RUSSELL R. KINSEY, *Examiner.*

W. L. SHEDD, T. A. LISLE, *Assistant Examiners.*